M. J. HELMER.
SPRING SUPPORT AND SHOCK ABSORBER FOR VEHICLE BODIES.
APPLICATION FILED OCT. 20, 1916.
1,216,993.
Patented Feb. 20, 1917.
2 SHEETS—SHEET 1.
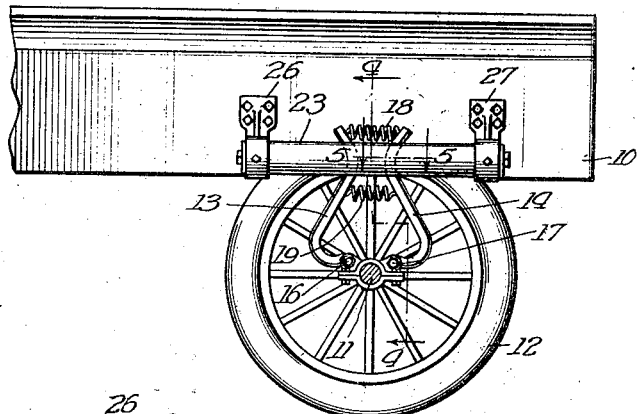
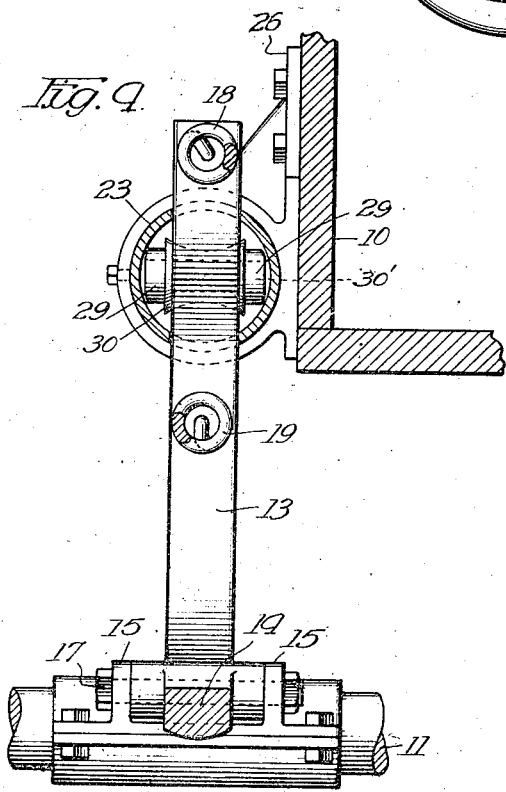
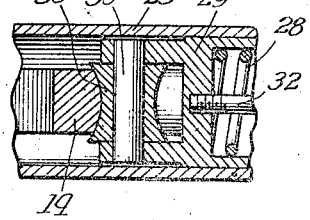
Witnesses:
Inventor
Milton J. Helmer M. J. HELMER.
SPRING SUPPORT AND SHOCK ABSORBER FOR VEHICLE BODIES.
APPLICATION FILED OCT. 20, 1916.
1,216,993.
Patented Feb. 20, 1917.
2 SHEETS—SHEET 2.
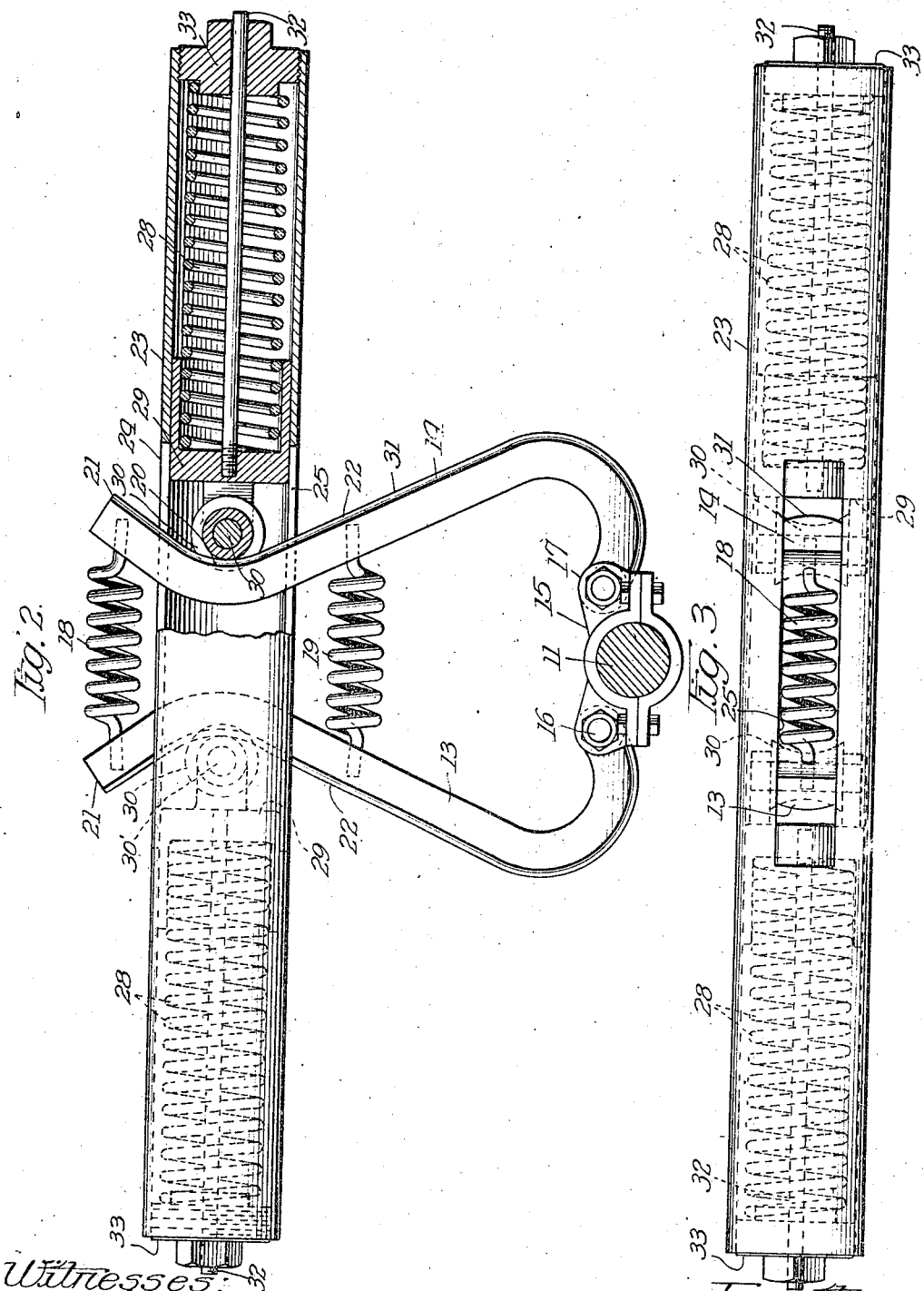

UNITED STATES PATENT OFFICE.

MILTON J. HELMER, OF CHICAGO, ILLINOIS, ASSIGNOR OF ONE-HALF TO SAM L. STONE, OF CHICAGO, ILLINOIS.

SPRING-SUPPORT AND SHOCK-ABSORBER FOR VEHICLE-BODIES.

1,216,993.  Specification of Letters Patent.  Patented Feb. 20, 1917.

Application filed October 20, 1916. Serial No. 126,777.

*To all whom it may concern:*

Be it known that I, MILTON J. HELMER, a citizen of the United States, residing at Chicago, in the county of Cook and State of Illinois, have invented certain new and useful Improvements in Spring-Supports and Shock-Absorbers for Vehicle-Bodies, of which the following is a specification.

My invention relates to improvements in combined spring-supports and shock-absorbers for vehicle bodies.

Some of the objects of my invention are to provide a spring structure, for vehicles, which will resiliently support the body of a vehicle upon the chassis or running gear thereof; which will readily respond to and absorb incipient vibrations, or light tremors produced by the wheels when moving over roadways having only slight inequalities of surface, and which will catch the rebound of the body or of the running gear, due to abrupt impact of the wheels with larger impediments in the roadway, whereby to cushion the momentum effect and produce smooth, comfortable riding.

Another object of my invention is to provide a practical; cheap to construct; stanch and reliable spring structure which can be easily and quickly applied by a novice, and which is not liable to derangement.

Other and further objects of my invention will become readily apparent, to persons skilled in the art, from a consideration of the following description when taken in conjunction with the drawings, wherein:—

Figure 1 is an elevation of parts of a vehicle, or wagon showing my spring structure applied thereto.

Fig. 2 is an enlarged elevation showing parts in section, of the spring structure.

Fig. 3 is a plan view of the spring structure.

Fig. 4 is an enlarged transverse section taken on line 4—4 of Fig. 1.

Fig. 5 is an enlarged section taken on line 5—5 of Fig. 1.

In all the views the same reference characters are employed to indicate similar parts.

10 is a conventional representation of a body part of a vehicle, such as an automobile, wagon, or the like, and 11 is the fixed axle thereof, upon which the wheels 12 rotate. My spring structure is arranged, between the body 10, and any part of the running gear such as the axle 11, and consists of cam levers 13 and 14 pivoted to a shackle 15, as at 16 and 17, respectively. The cam levers are shown secured to the fixed axle 11, but they could as well be secured to any other part of the running gear, for the purpose desired. The cam members or levers 13 and 14 are yieldingly held apart by intermediate compression springs 18 and 19, the terminal ends of the springs being inserted in perforations made in the respective levers. These springs are relatively strong and yield only when considerable force is applied tending to press the cam levers toward each other. The cam levers are provided with V-shaped cams each having a valley portion 20 and outwardly extending portions 21 above the valley and a similar outwardly-extending portion 22 below the valley.

A cylinder or pipe 23 is axially slotted, as at 24, and 25, to permit the cam levers 13 and 14 to pass through the cylinder 23 and to serve as guides for the cam members. The cylinder 23 is held to the body of the vehicle 10 by means of brackets 26 and 27. Inclosed in each end of the cylinder 23 is a compression spring 28, which enters a piston or movable abutment 29, at the inner end. Each abutment carries a roller 30, which engages a curved surface 31 of the cam member, and which is adapted to follow along on the cam surface of the lever when there is any relative vertical displacement between the cam mechanism and the cylinder 23. An axially positioned guide rod 32 may be fixed to the piston 29 and pass through the head 33 of the cylinder 23. This rod may, or may not be used, as desired.

The operation of the device is as follows:—The load imposed upon the spring structure, by the weight carried by the body of the vehicle, tends to vertically displace the cylinder 23 carrying the springs 28, the effect of which will cause the wheels 30 to ride upon the cam surface 22 of the cam levers, which causes compression of the springs 28, produced by the axial movement of the piston 29, due to the downward movement of the rollers 30 upon the cam surfaces. Any incipient or slight vibration is taken up by the springs 28—28 of the cylinder 23, as limited movement of these springs may be produced before the springs 18 and 19 are brought into action. Any considerable vertical displacement of the cylinder 23 with respect to the cams, will cause the rollers 30 to move down on the cam surfaces 22 of the respective cam levers, until the power of the springs 18 and 19 are substantially balanced by the springs 28—28 whereupon yielding resistance of the spring members, due to any violent concussion produced by relatively large impediments in the roadway is participated in by both systems of springs. Any extended rebound of the vehicle body, or of the running gear of the vehicle leaving the body, as when the traction wheels of the vehicle descend suddenly into a depression in the roadway, will cause the rollers 30 to ride upon the outwardly extending upper surfaces 21 of the cams, thereby causing compression of the springs 28—28, in the cylinder 23, tending to yieldingly check the rebound and preventing undesirable and undue relative movements of the running gear, and the body part of the vehicle away from each other. When the vehicle is moving over a normal road the rollers 30—30 rest, substantially, in the valleys 20—20 of the cam members, as shown in Fig. 2, and will return to approximately such positions after the occurrence of violent disturbance of the vehicle body and running gear, due to pronounced inequalities of the roadway. The rollers will be moved upwardly, upon the outwardly diverging legs of the cams as the result of the momentum produced by the abnormal motion of such parts of the vehicle, thereby yieldingly resisting this motion of the parts and absorbing the shocks that otherwise would be produced, by yieldingly opposing a tendency to excessive bounding of the vehicle body, by the relative displacement of the vehicle parts.

While the drawings show a plurality of cam members and a plurality of horizontally disposed cylinders including springs, as a preferred form of my invention, it is evident that a single spring and a single rigid cam member may be employed with greater or less effect.

While I have herein shown a single embodiment of my invention, for the purpose of clear disclosure, it is manifest that many changes may be made in the general form, configuration and disposition of the parts within the scope of the appended claims.

Having described my invention, what I claim is:

1. In a device of the character described the combination with a body and running gear of a vehicle, of two laterally movable, opposed cam levers, carried by one member thereof; springs holding them normally separated, and opposed springs carried by the other member, having parts bearing on the cam levers in the respective valleys thereof.

2. In a device of the character described the combination with a body and running gear of a vehicle, of two pivoted opposed cam levers, each lever having an upwardly inclined and a downwardly inclined part, carried by one of the vehicle members; springs holding the levers normally separated and opposed springs carried by the other member of the vehicle, having parts bearing on the cam levers between said inclined portions.

3. In a device of the character described the combination with a body and running gear of a vehicle, of two pivoted V-shaped cam levers with their apices in substantially the same horizontal plane, the inclined portions extending outwardly, carried by one vehicle member; a cylinder containing opposed compression coil springs each having a part bearing upon the respective cam levers tending to force them together, said cylinder being slotted near its center part to provide guides for the cam levers and other springs tending to force said cam levers apart.

In testimony whereof I hereunto set my hand in the presence of two subscribing witnesses.

MILTON J. HELMER.

In the presence of—
FORÉE BAIN,
MARY F. ALLEN.